(12) United States Patent
Kawasaki

(10) Patent No.: US 11,720,296 B2
(45) Date of Patent: Aug. 8, 2023

(54) STORAGE MEDIUM AND PRINT SYSTEM FOR EDITING PRINT SETTING INFORMATION

(71) Applicant: CANON KABUSHIKI KAISHA, Tokyo (JP)

(72) Inventor: Keiji Kawasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/699,808

(22) Filed: Mar. 21, 2022

(65) Prior Publication Data
US 2022/0308806 A1    Sep. 29, 2022

(30) Foreign Application Priority Data

Mar. 26, 2021  (JP) ................................. 2021-053209

(51) Int. Cl.
*G06F 3/12* (2006.01)
(52) U.S. Cl.
CPC .......... *G06F 3/1206* (2013.01); *G06F 3/1204* (2013.01); *G06F 3/1209* (2013.01); *G06F 3/1255* (2013.01); *G06F 3/1287* (2013.01)
(58) Field of Classification Search
CPC .... G06F 3/1206; G06F 3/1204; G06F 3/1209; G06F 3/1255; G06F 3/1287
USPC ....................................................... 358/1.14
See application file for complete search history.

(56) References Cited

U.S. PATENT DOCUMENTS

| 6,778,289 | B1 * | 8/2004 | Iwata | G06F 16/951 |
| | | | | 709/219 |
| 2016/0173731 | A1 * | 6/2016 | Mishima | H04N 1/00244 |
| | | | | 358/1.14 |
| 2019/0303057 | A1 * | 10/2019 | Suzuki | G06F 3/1267 |
| 2022/0300228 | A1 * | 9/2022 | Narita | G06F 3/1285 |

FOREIGN PATENT DOCUMENTS

JP    2000112706 A    4/2000

* cited by examiner

*Primary Examiner* — Allen H Nguyen
(74) *Attorney, Agent, or Firm* — Canon U.S.A., Inc. IP Division

(57) ABSTRACT

A non-transitory computer-readable storage medium storing a program for causing an information processing apparatus which communicates with a server system to execute a control method, wherein the control method includes acquiring print setting information of a first print instruction in a first format transmitted from the information processing apparatus to a printing apparatus without going through the server system, editing the acquired print setting information, and transmitting a second print instruction including the edited print setting information to the server system.

20 Claims, 10 Drawing Sheets

FIG. 4

| CLASSIFICATION | SETTING | VALUE |
|---|---|---|
| GENERAL INFORMATION | TENANT NAME 401 | XYCompany |
| | ADMINISTRATOR NAME | Admin |
| PRINT INFORMATION | PRINTER REGISTRATION BY USER 402 | PERMITTED |
| | REGISTRATION PERMITTED USER 403 | User A |
| | CONFIRMATION BY ADMINISTRATOR 404 | REQUIRED |
| PRINTER 1 INFORMATION | PRINTER NAME 405 | Printer A |
| | DEVICE ID 406  407 | Printer_A_XXXX |
| | REGISTRATION STATUS | REGISTERED |
| | SHARING SETTING 408 | SHARED |
| | INITIAL SETTING 409 | 2-up, monochrome |
| | USER 410 | User A, User B |
| | PRINTER CAPABILITY 411 | Paper Size: A3, A4... Media Type: Plain... ... |
| | PRINTER STATUS 412 | IDLE |
| PRINTER 2 INFORMATION | PRINTER NAME | Printer B |
| | DEVICE ID | Printer_B_XXXX |
| | REGISTRATION STATUS | AWAITING APPROVAL |
| | SHARING SETTING | NOT SHARED |
| | INITIAL SETTING | Duplex |
| | USER | None |
| | PRINTER CAPABILITY | Paper Size: A4, Letter... Media Type: Plain, Photo... Duplex: on, off ... |
| | PRINTER STATUS | OUT OF PAPER |

FIG. 7

```
<?xml version="1.0" encoding="UTF-8" ?>
<psf:PrintTicket ... >                                    — 702      — 701
  <psf:Feature name="psk:PageMediaSize">
   <psf:Option name="psk:ISOA4">
      :
   </psf:Option>
  </psf:Feature>
  <psf:Feature name="psk:JobLogPrint">            — 703
     <psf:Option name="psk:ON">
  </psk:JobLogPrint>                              — 704
  <psf:Feature name="psk:JobPrintStatus">
     <psf:Option name="psk:Printed">
  </psk:JobLogPrint>
   :
</psf:PrintTicket>
```

FIG. 8

```
Hypertext Transfer Protocol
   POST //ipp/print HTTP/1.1¥r¥n
        :
Internet Printing Protocol
   operation-id: Validate-Job (0x0004)
   operation-attributes-tag
      attributes-charset (charset): 'utf-8'
      attributes-natural-language (naturalLanguage): 'en'
         :
   job-attributes-tag          ⌐82
      media (keyword): 'iso_a4_210x297mm'   ⌐83
      joblogprint (keyword): 'on'           ⌐84
      printstatus (keyword): 'printed'⌐85
         :
   end-of-attributes-tag
```
— 81

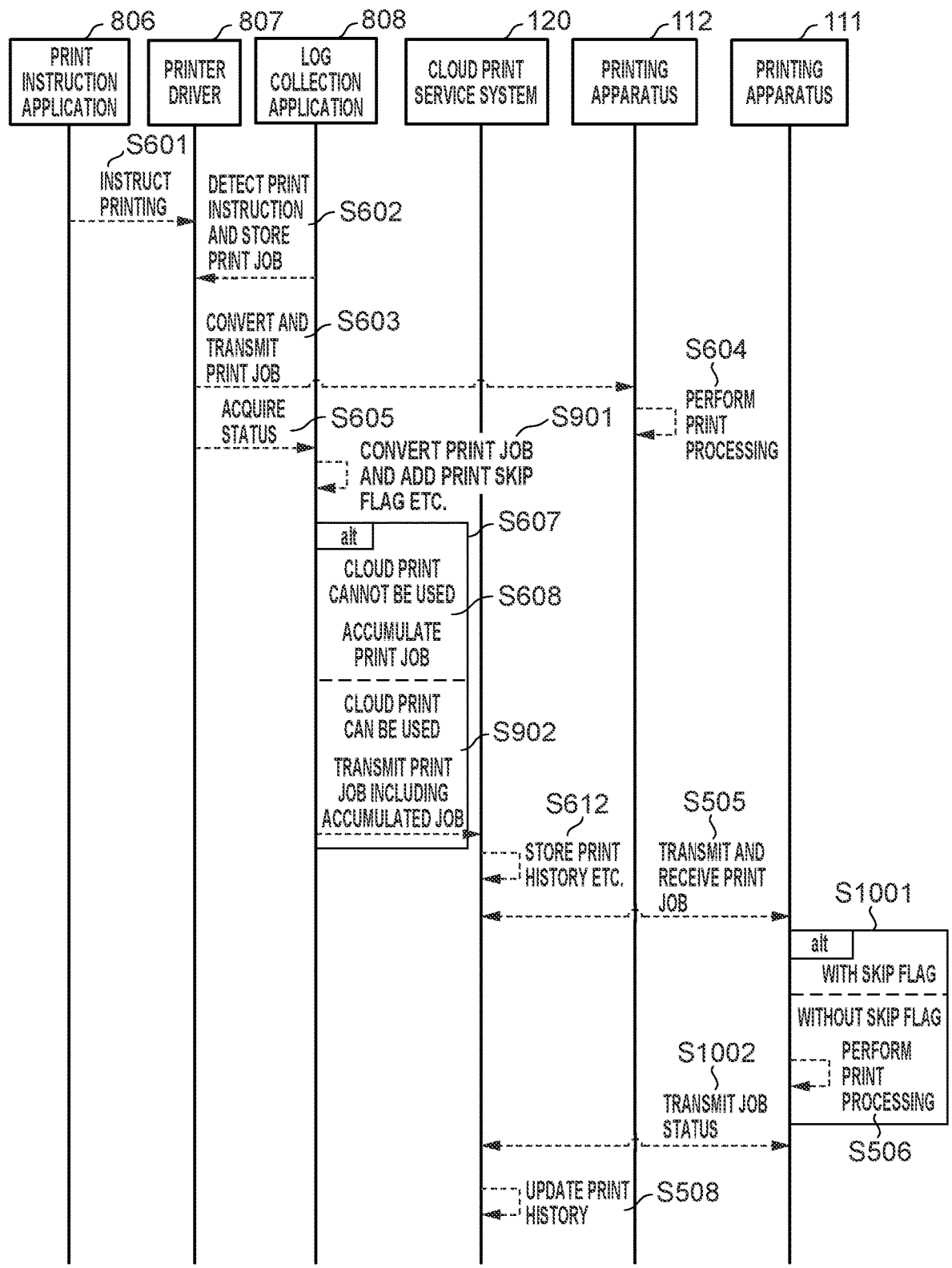

STORAGE MEDIUM AND PRINT SYSTEM FOR EDITING PRINT SETTING INFORMATION

BACKGROUND

Field

The present disclosure relates to a storage medium and a print system.

Description of the Related Art

A configuration is known in which an information processing apparatus such as a personal computer (PC) executes printing via a server in a cloud. Specifically, the information processing apparatus issues a print request to a cloud print service system configured in the cloud and transmits the print request to an associated printing apparatus in the cloud print service system. The cloud print service system as described-above is also used in a use case in which employees share a printing apparatus in a company. In such a case, all print requests from the employees in the company go through the cloud print service system before the print jobs reach the printing apparatus. The cloud print service system has a capability to manage a history of the print request. Thus, an administrator who manages an information technology (IT) infrastructure in a company can use a history management function of the cloud print service system to refer to the number of prints, a used print setting, and the like for each department in the company.

As described above, a configuration for collectively managing a print history in a company and the like is known.

According to Japanese Patent Application Laid-Open No. 2000-112706, in a case where a collection server which is a transmission destination of a print history is in an abnormal state, print history data is saved, and the saved print history data is transmitted to the server after the server is restored in a normal state. With this configuration, a system according to Japanese Patent Application Laid-Open No. 2000-112706 can normally manage the print history even when an abnormality occurs in the collection server for the print history.

In order to perform printing via a cloud print service system, it is an essential prerequisite that both an information processing apparatus and a printing apparatus are connected to a network (for example, Internet). Thus, there is an issue that, in a case where a print job is directly requested from the information processing apparatus to the printing apparatus using a universal serial bus (USB) cable and the like due to a reason such as being temporarily unable to connect to the Internet, a print history of the print job is not accumulated in the cloud print service system.

SUMMARY

Embodiments of the present disclosure are directed to the provision of a technique for managing a print history in an environment in which the above-described issue occurs. According to embodiments of the present disclosure, a non-transitory computer-readable storage medium storing a program for causing an information processing apparatus which communicates with a server system to execute a control method, wherein the control method includes acquiring print setting information of a first print instruction in a first format transmitted from the information processing apparatus to a printing apparatus without going through the server system, editing the acquired print setting information, and transmitting a second print instruction including the edited print setting information to the server system.

Further features of the present disclosure will become apparent from the following description of exemplary embodiments with reference to the attached drawings.

BRIEF DESCRIPTION OF THE DRAWINGS

FIG. 4 illustrates an example of various types of setting information managed in the cloud print service system.

FIG. 7 illustrates an example of a PrintTicket.

FIG. 8 illustrates an example of a Validate-Job operation.

FIG. 10 is a sequence diagram illustrating another configuration of a print flow via the printer driver.

DESCRIPTION OF THE EMBODIMENTS

Figure 1:
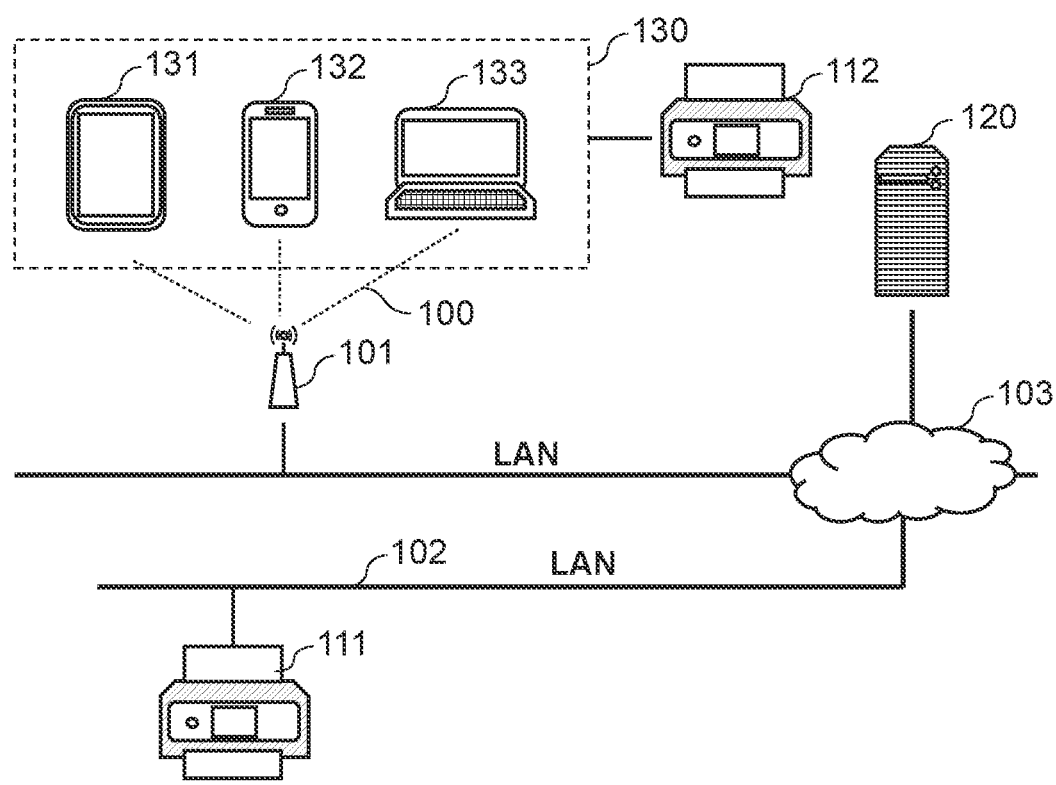
FIG. 1 is a configuration diagram of a print system.

Exemplary embodiments of the present disclosure will be described in detail below with reference to the attached drawings. It is noted that the exemplary embodiments described below are not meant to limit the scope of the present disclosure. Further, not all combinations of features described in the exemplary embodiments are essential for solving means of the present disclosure. The same components are denoted by the same reference numerals and descriptions thereof are omitted.

<Configuration of Print System>

FIG. 1 illustrates a configuration of a print system according to a first exemplary embodiment of the present disclosure. A printing apparatus 111 is connected to a local area network (LAN) 102.

The printing apparatus 111 handles (supports) printing based on an Internet Printing Protocol (IPP) specification and a standard specification for cloud printing. The printing apparatus 111 handles printing based on a cloud print function based on the standard specification for executing cloud printing referred to as IPP Shared Infrastructure Extensions (hereinbelow, referred to as IPP-Infra) as an example of the standard specification for cloud printing. A printing apparatus 112 may or may not be able to handle (support) printing based on the IPP specification and the standard specification for cloud printing.

A tablet 131, a smartphone 132, and a personal computer (PC) 133 are connected to a LAN 100 constructed by an access point (AP) 101. In the following description, the tablet 131, the smartphone 132, and the PC 133 may be collectively referred to as an information processing apparatus 130. The printing apparatus 112 is directly connected to the information processing apparatus 130 with a universal serial bus (USB) cable and the like. The information processing apparatus 130 can transmit a print job as a print instruction to the printing apparatus 112 using a print function provided in an operating system (OS) operating in the information processing apparatus 130 and a printer driver described below. In FIG. 1, the printing apparatus 112 is not connected to the LAN 100, but the present exemplary embodiment is not limited to this configuration. In other words, the printing apparatus 112 may be configured to be connected to the LAN 100 and to be communicable with the information processing apparatus 130 via the LAN 100.

The LAN 100 and the LAN 102 are connected to an Internet 103. A cloud server system (hereinbelow, referred to as a cloud print service system) 120 which provides a print service in the cloud is connected to the Internet 103. The information processing apparatus 130 and the printing apparatus 111 can communicate with the cloud print service system 120 via the Internet 103.

The cloud print service system 120 supports the cloud print function based on the IPP-Infra as an example, and temporarily stores a print job based on the IPP specification. Further, the cloud print service system 120 provides a function of transmitting the print job to the printing apparatus 111 based on an IPP-Infra specification in response to a request from the printing apparatus 111 supporting a cloud printing specification based on the IPP-Infra.

The OS in the information processing apparatus 130 is equipped, as standard, with a program referred to as an IPP-Client module which can generate a print job based on the IPP specification. The information processing apparatus 130 can generate a print job based on the IPP specification using the IPP-Client module. In a case where the information processing apparatus 130 transmits a print job to the cloud print service system 120 based on an instruction from a user, the cloud print service system 120 retains the print job in the cloud.

The printing apparatus 111 which supports cloud printing based on the IPP-Infra specification requests the print job from the cloud print service system 120 when the print job is stored in the cloud print service system 120. The printing apparatus 111 may periodically request acquisition of a print job from the cloud print service system 120. Alternatively, the printing apparatus 111 may request acquisition of a print job from the cloud print service system 120 in response to an instruction from a user, to the printing apparatus 111, to acquire the print job.

Alternatively, in a case where a print job is stored in the cloud print service system 120, the cloud print service system 120 may issue a notification indicating that the print job is stored in the cloud print service system 120 to the printing apparatus 111. In this case, if the notification indicating that the print job is stored is received, the printing apparatus 111 requests acquisition of the print job from the cloud print service system 120. The cloud print service system 120 transmits the print job retained in the cloud print service system 120, as the print instruction, to the printing apparatus 111 in response to the request from the printing apparatus 111. Accordingly, the printing apparatus III acquires the print job and executes printing.

In order to use the cloud print service system 120, a user (an administrator) who has an administrator authority in the cloud print service system 120 needs to register the printing apparatus in the cloud print service system 120. Specifically, the user operates the printing apparatus 111 and performs processing for registering the printing apparatus 111 in the cloud print service system 120 in advance.

The cloud print service system 120 according to the present exemplary embodiment may be configured with a single server or may be configured to execute each function by a plurality of servers in the cloud which operate in cooperation with each other. Further, the cloud print service system 120 may be configured with a server apparatus in a local network. According to the present exemplary embodiment, the above-described configuration is described as an example of the print system. However, the present disclosure is not limited to the above-described configuration, and it is sufficient that the information processing apparatus 130, the cloud print service system 120, and the printing apparatus 111 are communicably connected to each other via the network. The network may be wireless or wired.

<Hardware Configuration of Information Processing Apparatus and Cloud Print Service System>

Figure 2:
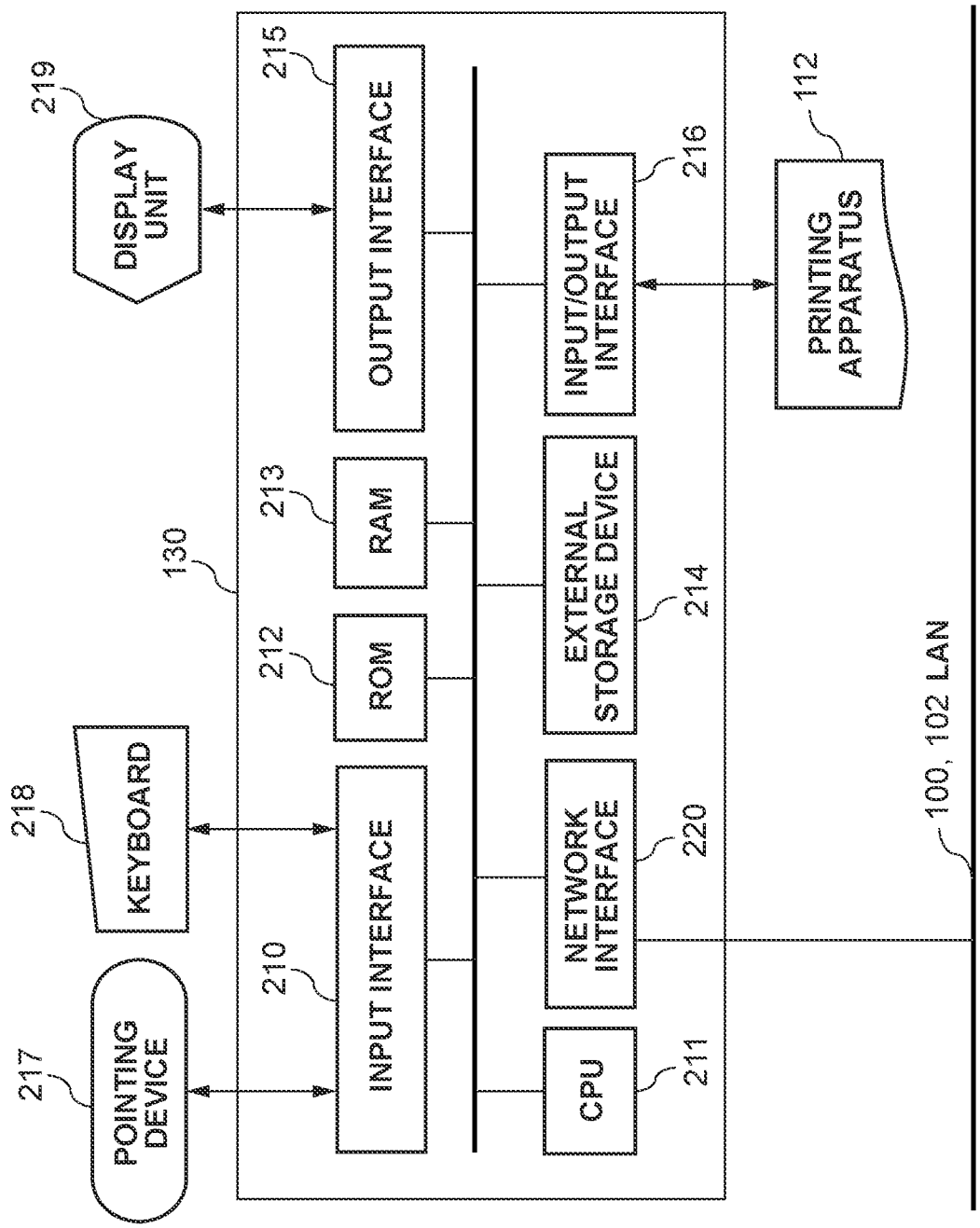
FIG. 2 is a block diagram illustrating a hardware configuration of an information processing apparatus and a cloud print service system.

FIG. 2 is a block diagram illustrating a hardware configuration of the information processing apparatus 130. The information processing apparatus 130 in FIG. 2 is a PC, as an example, and includes an input interface 210, a central processing unit (CPU) 211, a read-only memory (ROM) 212, a random access memory (RAM) 213, an external storage device 214, an output interface 215, and an input/output interface 216. The input interface 210 is connected to input devices such as a keyboard 218 and a pointing device 217, and the output interface 215 is connected to a display device such as a display unit 219.

The ROM 212 stores an initialization program, and the external storage device 214 stores a group of application programs, an OS, and various types of data. The RAM 213 is used as a work memory in a case where various programs stored in the external storage device 214 are executed. The information processing apparatus 130 is also connected to the LAN 100 via a network interface 220.

According to the present exemplary embodiment, the CPU 211 performs processing according to a procedure of a program stored in the ROM 212 and thus executes a function of the information processing apparatus 130 and processing illustrated in flowcharts which are described below. The printing apparatus 112 as a device is connected to the information processing apparatus 130 via the input/output interface 216. According to the present exemplary embodiment, the information processing apparatus 130 and the printing apparatus 112 are configured separately, but may be configured as a single information processing apparatus. The printing apparatus is described using an inkjet printer, as an example, which performs printing by ejecting ink on a paper surface, but printing may be executed using another method (for example, an electrophotographic method). Further, the information processing apparatus 130 may be a server apparatus, a desktop computer, a smartphone, and a laptop computer.

A hardware configuration of the cloud print service system 120 is the same as the hardware configuration illustrated in FIG. 4, and thus the description thereof is omitted <Software Configuration of Information Processing Apparatus>

Figure 3:
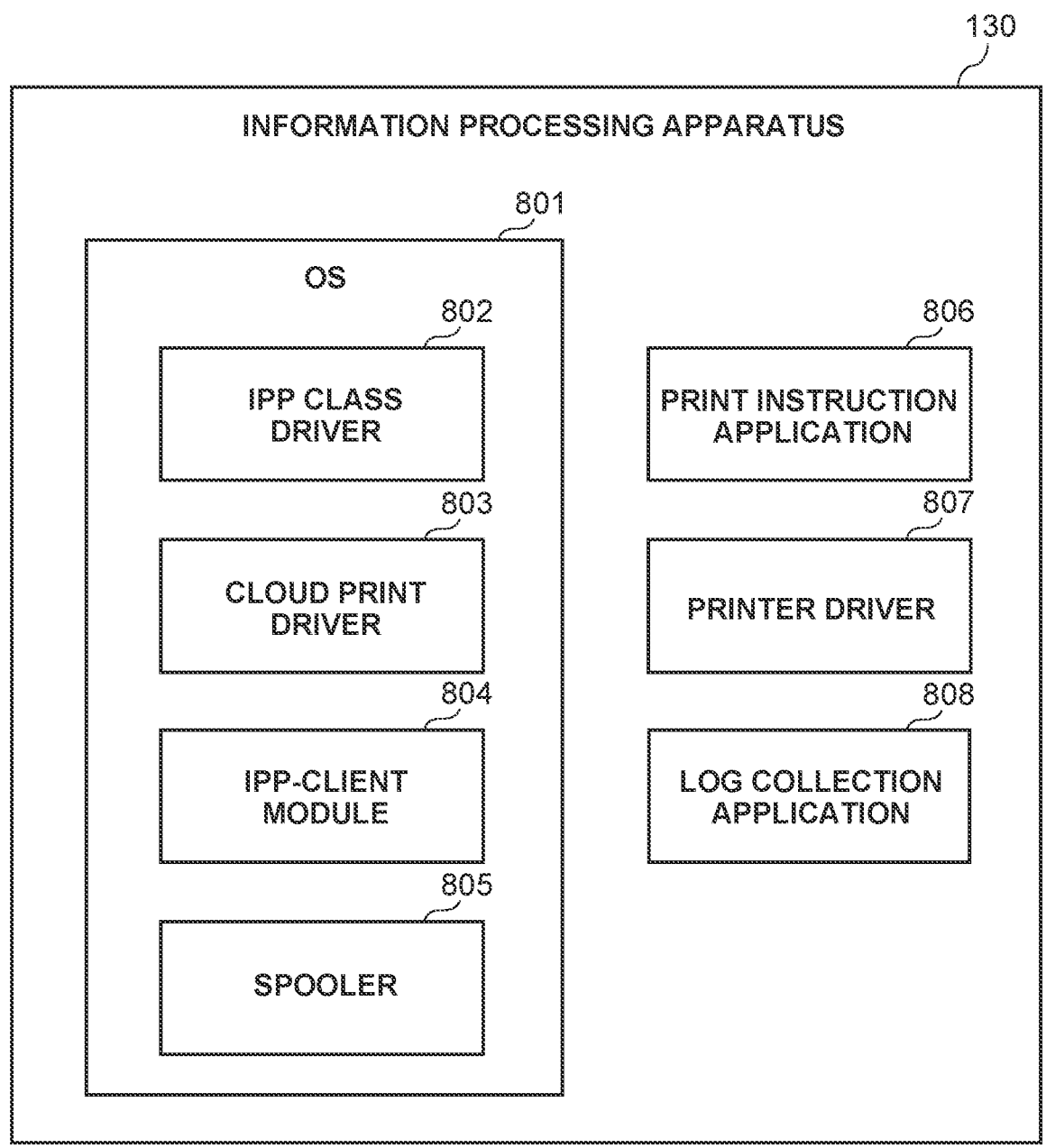
FIG. 3 is a functional block diagram illustrating a software configuration of the information processing apparatus.

FIG. 3 is a functional block diagram illustrating a software configuration related to print processing of the information processing apparatus 130 according to the present exemplary embodiment. In the following description, each software and a functional block may be described as an entity of each processing, but in practice, the corresponding function is realized by the CPU 211 executing a corresponding program.

An OS 801 is installed on the information processing apparatus 130. The OS 801 includes an IPP class driver 802, a cloud print driver 803, an IPP-Client module 804, and a spooler 805 as functions of the OS.

The IPP class driver 802 is a printer driver (print data generation software) for causing the printing apparatus (for example, the printing apparatus 112 in a state of being connected to the LAN 100) connected to the LAN 100 (the same network as the information processing apparatus 130) to execute printing by transmitting a print job based on the IPP specification thereto.

The cloud print driver 803 is a printer driver (print data generation software) which can cause the printing apparatus which is not connected to the same local network as the information processing apparatus 130 to execute printing by going through the Internet 103. The cloud print driver 803 transmits the print job based on the IPP specification to the cloud print service system 120. The printing apparatus (for example, the printing apparatus 111) which supports cloud printing based on the IPP-Infra specification and is registered in the cloud print service system 120 receives the print job transmitted by the cloud print driver 803 from the cloud print service system 120 and performs printing.

The IPP-Client module 804 is a program for generating a print job based on the IPP specification. The IPP class driver 802 and the cloud print driver 803 generate print jobs based on the IPP specification using the IPP-Client module 804.

The spooler 805 is a program for temporarily storing a print job (print target data) received from the print instruction application 806 described below and transmitting the print job to the printer driver. Further, the spooler 805 can execute processing related to printing such as transmitting the print job (print data) generated by the printer driver to the printing apparatus as the print instruction.

The print instruction application 806 has a print instruction function.

Specifically, the print instruction application 806 is a drawing application which can generate drawing data such as document data and figure data and issue a print instruction.

A printer driver 807 is a program (print data generation software) for causing the printing apparatus (for example, the printing apparatus 112) connected to the information processing apparatus 130 to execute printing. The printer driver 807 is a unique printer driver which is usually provided individually for each model of the printing apparatus by a vendor which provides the printing apparatus. Specifically, in a case where the printer driver 807 receives a print job from the print instruction application 806 via the spooler 805, the printer driver 807 converts the print job into a print job in a format which can be interpreted by the printing apparatus 112 (for example, a vendor-specific format which is different from a format based on the IPP specification). Then, the printer driver 807 transmits the print job to the printing apparatus 112 via the spooler 805 again. Accordingly, printing corresponding to the instruction from the print instruction application 806 is executed in the printing apparatus 112.

A log collection application 808 is a program for transmitting print history information to the cloud print service system 120 by processing described below.

<Information Managed by Cloud Printing Service>

FIG. 4 is a table schematically indicating examples of representative information among various types of setting information managed by the cloud print service system 120 according to the present exemplary embodiment. The cloud print service system 120 is configured to be available to each group such as a company, and is managed so that one company cannot view information of another company. One group is referred to as a tenant (a directory), and FIG. 4 indicates setting information of a tenant named "XY Company" as a fictitious company. A setting 401 is an administrator name, and a user identification (ID) of an administrator authority having an authority to change various settings of the tenant is stored as a corresponding value. A plurality of user IDs may be stored in the value of the administrator name. The administrator authority represents a user who is authorized to permit registration of the printing apparatus in the cloud print service system 120, and according to embodiments of the present disclosure, a user having the administrator authority may be referred to as an administrator.

A setting 402 classified as print information stores information indicating whether a user ID having a user authority is permitted to register a printer. A setting 403 is registration permitted user information, and a user ID of a user who is permitted to register a printer is stored as a corresponding value. A plurality of user IDs can be stored in the setting 403. A setting 404 stores a value of information indicating whether confirmation by the administrator is required in a case where a printer registration request (registration request) is made by the user ID having the user authority. The administrator can change the values of the settings 402, 403, and 404. The user authority is more restricted than the administrator authority, and for example, the user authority cannot change the values of the settings 402, 403, and 404 which can be changed by the administrator authority.

In the tenant indicated in FIG. 4, two printers, namely a printer 1 and a printer 2 are registered. The printer described here is a logical printer registered in the cloud print service system 120 and is associated with a physical printing apparatus (printer) such as the printing apparatus 111 in FIG. 1. An issued print request is accumulated in a corresponding logical printer, and when acquisition of the print job is requested from an actual physical printing apparatus registered in association with the logical printer, the print job is deleted from the logical printer.

Three or more printers can be registered in the cloud print service system 120, and in this case, pieces of information corresponding to the number of registered printers are stored. A setting 405 is a printer name, and a name of the printer is stored as a corresponding value. A setting 406 is a device ID, and an ID that uniquely identifies the printer is stored as a corresponding value. A setting 407 is a registration status, and a value indicating a registration status of the printer is stored. A registration status of the printer 1 is "registered" which indicates that the printer 1 is in an available state. Whereas, a registration status of the printer 2 is "awaiting approval" which indicates that the printer 2 is awaiting approval by the administrator.

A setting 408 is a sharing setting, and a value indicating whether the printer is in a shared state where the printer can be used by another user is set. A setting 409 is an initial setting and indicates a print setting in a default state in a case where printing is performed by the printer in the cloud print service system 120. A setting 410 indicates a user who can user the corresponding printer in the cloud print service system 120. In FIG. 4, two users, a user A and a user B, are registered, but three or more users may be registered.

The administrator can change the values of the settings 408, 409, and 410. A setting 411 is a printer capability, and a print setting which can be specified by the printer and a setting value thereof are stored as values.

A setting 412 is a printer status, and a current status of the registered printing apparatus is stored as a value. The status changes according to a state of the actual associated printing apparatus.

As described above, a plurality of printing apparatuses can be registered in the cloud print service system 120. Further, a user who can use each of printing apparatuses in the cloud print service system 120 can be set.

<Print Flow Via Cloud Print Service System>

Figure 5:
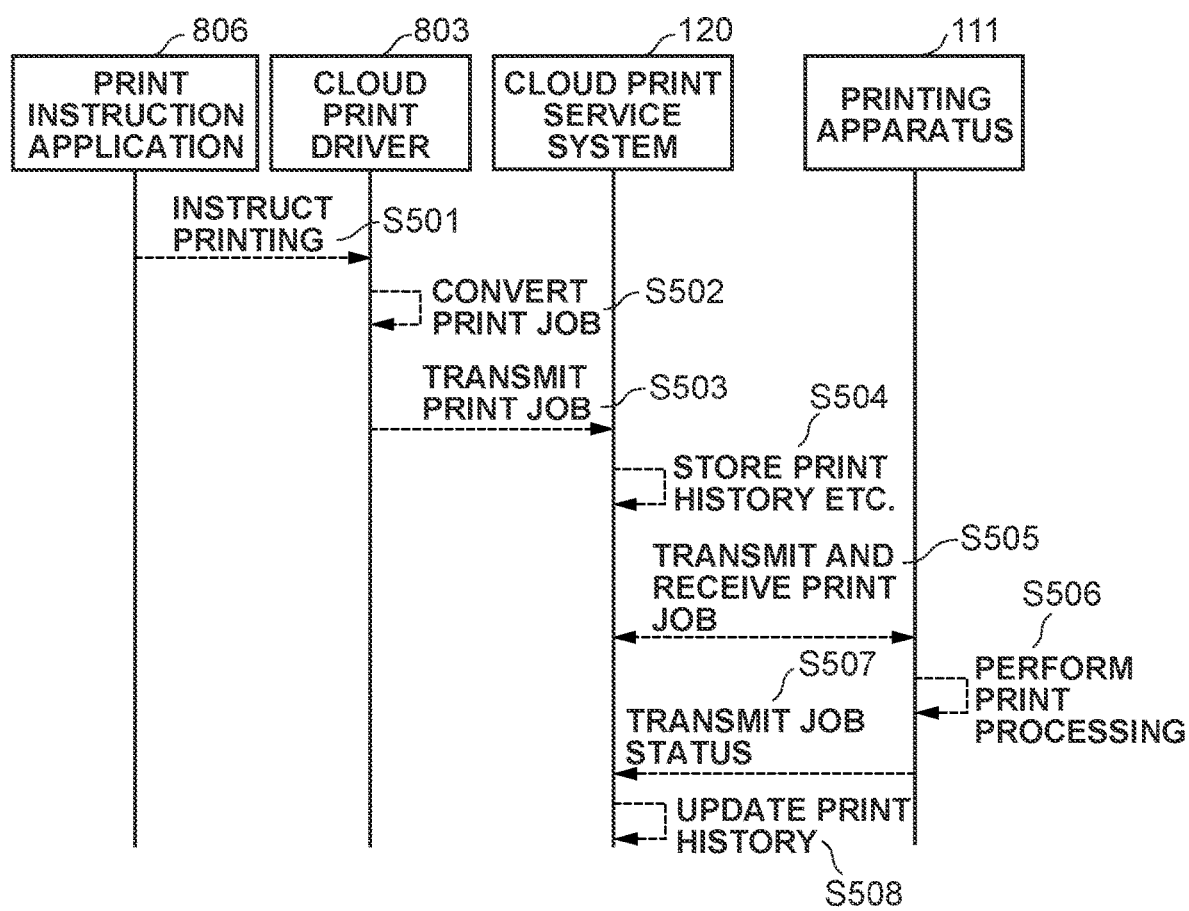
FIG. 5 is a sequence diagram illustrating a print flow via the cloud print service system.

FIG. 5 is a sequence diagram illustrating a print flow via the cloud print service system 120 according to the present exemplary embodiment. In the following description, each software and a functional block may be described as an entity of each processing, but in practice, the corresponding function is realized by the CPU 211 executing a corresponding program. In the following description, it is assumed that a user logs into the cloud print service system 120 using any one of the information processing apparatuses 130 in FIG. 1. Further, it is assumed that the printing apparatus 111 is registered in the cloud print service system 120, and the user is registered as a user who can use the printing apparatus 111.

In step S501, in a case where a print instruction is received from the user, the print instruction application 806 in the information processing apparatus 130 issues a print job to the cloud print driver 803. In step S502, the cloud print driver 803 converts the received print job into a print job (print data) in a format based on the IPP specification. Next, in step S503, the cloud print driver 803 transmits the converted print job to the cloud print service system 120.

In step S504, the cloud print service system 120 temporarily stores the received print job and also stores a print history. The print history to be stored includes information about the print job such as the number of pages and print setting information (double side printing, monochrome printing, and the like), information about a user who instructs printing which is included in the print job, printing apparatus information, and print status information. In step S504, the cloud print service system 120 stores information indicating that printing is in progress as the print status information.

Subsequently, in step S505, the printing apparatus 111 requests the print job from the cloud print service system 120. As described above, the cloud print service system 120 may be configured to notify the printing apparatus 111 of presence of the print job.

In step S506, the printing apparatus 111 performs print processing based on the received print job.

Next, in step S507, the printing apparatus 111 transmits the print status information (a job status) indicating that printing is completed to the cloud print service system 120. In practice, it is desirable that the printing apparatus 111 appropriately transmit, to the cloud print service system 120, information indicating that printing of a specific page is completed and information indicating that printing is canceled by a user operation.

After the processing in step S507, in step S508, the cloud print service system 120 updates the print history stored in step S504. Specifically, the cloud print service system 120 stores the status received in step S507 as the print status information included in the print history. In a case where printing of all pages is completed in step S506, information indicating that printing is completed is stored as the print status information. In a case where printing is canceled in the middle, a fact that printing is canceled and the number of pages printing of which is completed are stored as the print status information. Thus, the print flow via the cloud print service system 120 is described above.

In a company, if all printing is performed via the above-described cloud print service system 120, print histories of all the print jobs in the company are accumulated in the cloud print service system 120. A user who has the administrator authority in the tenant having the cloud print service system 120 can refer to all the print histories in the tenant to which the user belongs. The print history includes the information about the user who instructs printing, so that the administrator can easily check a print volume of a specific user or a specific department. As described above, the administrator can easily manage printing in the company at low cost by using the cloud print service system 120.

<Print Flow Via Printer Driver>

Figure 6:
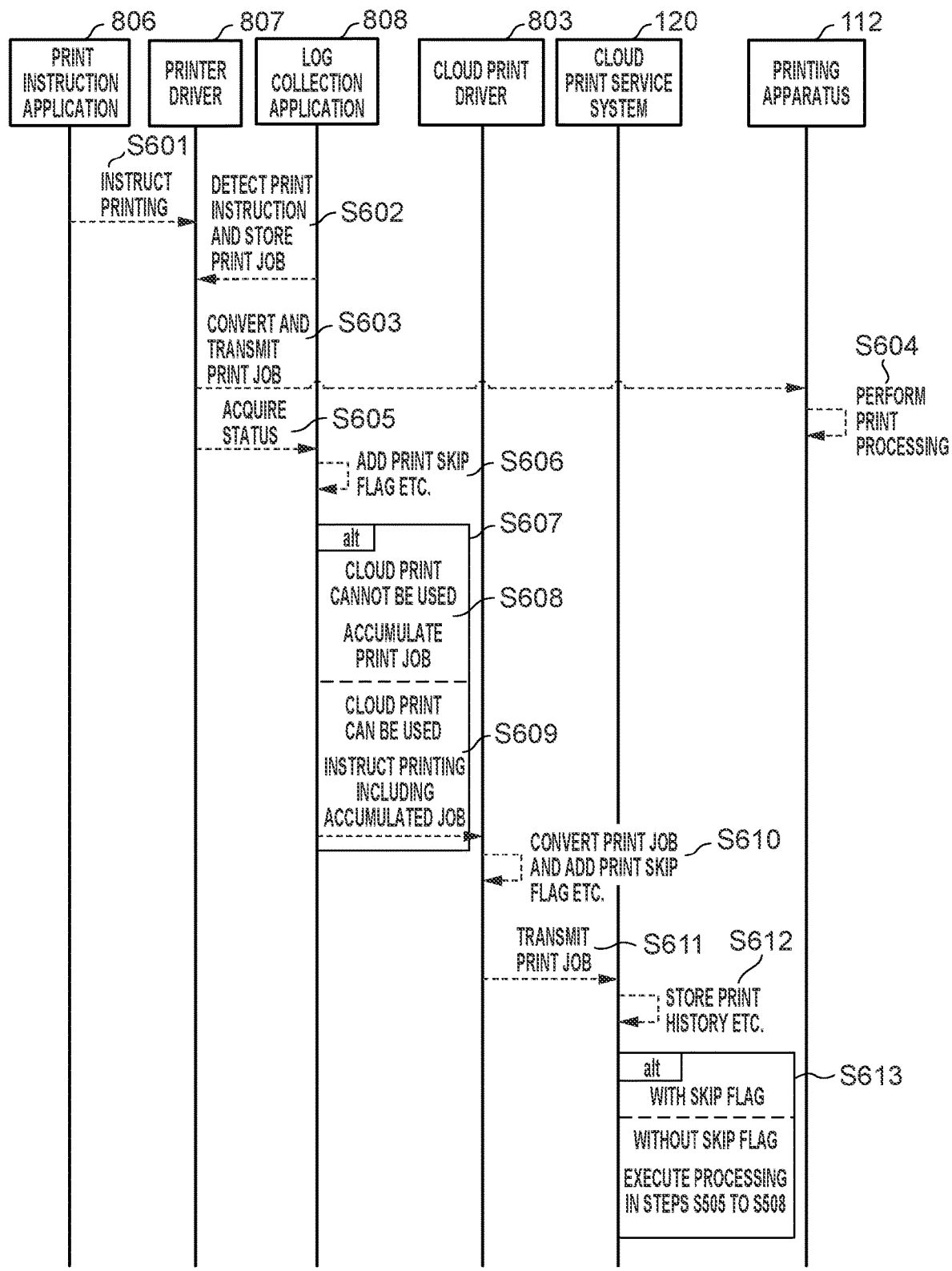
FIG. 6 is a sequence diagram illustrating a print flow via a printer driver.

Next, a flow for executing printing without going through the cloud print service system 120 will be described. FIG. 6 is a sequence diagram illustrating a print flow via the printer driver 807 according to the present exemplary embodiment. In the following description, each software and a functional block may be described as an entity of each processing, but in practice, the corresponding function is realized by the CPU 211 executing a corresponding program. In the description below, it is assumed that a user logs into the cloud print service system 120 using any one of the information processing apparatuses 130 in FIG. 1. Further, it is assumed that the printing apparatus 111 is registered in the cloud print service system 120, and the user is registered as a user who can use the printing apparatus 111. The IPP class driver 802 may be used instead of the printer driver 807. The log collection application 808 is installed on the information processing apparatus 130. Further, it is desirable that the log collection application 808 be resident and activated while the information processing apparatus 130 is activated. A user who uses the information processing apparatus 130 may install the log collection application 808 on the information processing apparatus 130. Alternatively, an administrator of a department for managing an information technology (IT) infrastructure in the company to which the user belongs may install the log collection application 808 on all the information processing apparatuses in the company in advance or may set to automatically install the log collection application 808 on them.

In step S601, upon receiving a print instruction from the user, the print instruction application 806 in the information processing apparatus 130 issues a print job to the printer driver 807. The log collection application 808 is configured to monitor presence or absence of the print job for all the printer drivers installed on the information processing apparatus 130. In step S602, in a case where the log collection application 808 confirms that the print job is added to the printer driver 807, the log collection application 808 stores the added print job in the external storage device 214 or the RAM 213.

Meanwhile, in a case where the printer driver 807 receives the print job in step S601, in step S603, the printer driver 807 converts the received print job into a print job in the format which can be interpreted by the printing apparatus 112 (for example, a printer vendor-specific format), and transmits the converted print job to the printing apparatus 112. In step S604, the printing apparatus 112 performs print processing based on the received print job. In this example, it is assumed that the information processing apparatus 130 and the printing apparatus 112 are connected to each other by a USB cable and the like.

As described above, the print job does not go through the cloud print service system 120 in printing via the printer driver 807, the cloud print service system 120 cannot store the print history. Printing going through the cloud print service system 120 is premised on a fact that both of the information processing apparatus which issues a print request and the printing apparatus are connected to the same network (for example, the Internet) as the cloud print service system 120. Therefore, printing going through the cloud print service system 120 cannot be instructed in a situation in which there is no Internet access at a customer's place and the like. Accordingly, even if it is desired to collectively manage the print history of printing which occurs in the company by the cloud print service system 120, it is difficult to manage the print history of printing which occurs in a situation in which the Internet is temporarily not connected. Thus, a method for managing the print history using the log collection application 808 according to the present exemplary embodiment will be described below.

After the processing in step S602, in step S605, the log collection application 808 acquires a print status of the print job in the printer driver 807 (status information acquired from the printing apparatus 112) by inquiring of the spooler 805 about the status. Specifically, the log collection application 808 repeatedly makes an inquiry to the spooler 805 in the processing in step S605 and acquires the number of processed pages in the print job and the status of the print job. The log collection application 808 confirms completion of the print job and then terminates the processing in step S605. Based on the processing, the log collection application 808 determines whether printing of the print job is completed or is canceled in the middle, and up to which page printing has been performed in a case where printing is canceled.

After the processing in step S605, in step S606, the log collection application 808 edits the print job stored in step S602 and adds a flag for skipping printing and the status of the print job determined in step S605 to the print setting information included in the print job.

The print setting information after addition processing in step S606 is executed by the log collection application 808 will be described with reference to FIG. 7. In the description, it is assumed that the print job (print data) is in an Extensible Markup Language paper specification (XPS) data format, and the print setting information included in the print job is a PrintTicket. Embodiments of the present disclosure can be applied to data formats other than the above by the similar processing. A PrintTicket 701 includes a setting for specifying a print operation by the printing apparatus and includes, for example, information 702 for specifying a sheet size used for printing.

In the information 702, a selection item (Option) referred to as an A4 size (ISOA4) is specified in a function (Feature) referred to as "PageMediaSize".

Information 703 indicates whether to perform actual printing or skip the actual printing for the purpose of collecting a log. In the PrintTicket 701, the Option of the Feature referred to as "JobLogPrint" meaning a log collecting function is set to "ON" which indicates that printing is for the purpose of log collection. In a case where actual printing is performed, the Option of the Feature referred to as "JobLogPrint" is set to "OFF". Information 704 indicates the status information of the print job. In the PrintTicket 701, the Option of the Feature referred to "JobPrintStatus" indicating the status information is set to "Printed" which indicates that printing of the print job is normally completed. The information 703 and the information 704 are added by the log collection application 808 in step S606. In step S606, the log collection application 808 stores "ON" in the information 703 and also stores the status information acquired in step S605 in the information 704.

In the information 704 in FIG. 7, information indicating that printing of the print job is normally completed is stored as the status information. However, in a case where the print processing in step S604 is canceled in the middle, information indicating cancellation (Canceled), information about the number of pages which are printed before the cancellation, and the like are stored in the information 704.

After the processing in step S606, in step S607, the log collection application 808 determines whether the information processing apparatus 130 is in a state of being able to use cloud printing. Specifically, the log collection application 808 checks whether the information processing apparatus 130 is connected to the Internet, the cloud print driver 803 is installed in the information processing apparatus, and if the information processing apparatus 130 is logged into the cloud print service system 120, and the like. In a case where these conditions are all satisfied, the log collection application 808 determines that the information processing apparatus 130 can use cloud printing and otherwise determines that the information processing apparatus 130 cannot use cloud printing.

In a case where it is determined in step S607 that the information processing apparatus 130 cannot use cloud printing, in step S608, the log collection application 808 stores the print job in the external storage device 214 or the RAM 213 and terminates the processing.

Whereas, in a case where it is determined in step S607 that the information processing apparatus 130 can use cloud printing, in step S609, the log collection application 808 transmits the print job which is stored in step S602 and edited in step S606 to the cloud print driver 803 and instructs printing. In step S609, it is desirable that the log collection application 808 instruct the cloud print driver 803 to print all the print jobs including a plurality of the print jobs accumulated in the past in step S608. Accordingly, the log collection application 808 can deal with a case in which the information processing apparatus 130 is temporarily not connected to the Internet by the processing from steps S607 to S609. Specifically, it is desirable that the log collection application 808 be configured to transmit the accumulated print job for log collection to the cloud print service system 120 after the information processing apparatus 130 is connected to the Internet.

The log collection application 808 may periodically perform determination in step S607 even if it is not after the processing in step S606. In other words, the log collection application 808 may be configured to periodically perform determination in step S607 and transmit the print job for log collection which has been accumulated in the past in step S608 to the cloud print driver 803 in a case where it is determined that the information processing apparatus 130 can use cloud printing. Accordingly, the print history can be transmitted to the cloud print service system 120 as soon as possible.

Upon receiving the print instruction in step S609, in step S610, the cloud print driver 803 converts the received print job into a print job in the format based on the IPP specification. At that time, the flag for skipping printing and the status information of the print job, which are added to the print setting information in step S606, are also converted. FIG. 8 conceptually illustrates an example of a Validate-Job operation 81 of the IPP which is included in the print job generated by the cloud print driver 803 in step S610. The Validate-Job operation 81 is the print setting information in the IPP and includes print setting attribute information 82. The information 702, the information 703, the information 704 included in the print job before conversion in step S609 respectively become information 83, information 84, and information 85 in the print job after conversion. The information 83 indicates that a sheet size used for printing is the A4 size. The information 84 indicates that the printing is for the purpose of log collection. The information 85 indicates that printing of the print job is normally completed. In other words, setting values having the same meaning as the setting values indicated by the information 702 to the information 704 are stored as values of the information 83 to the information 85 as they are.

According to the present exemplary embodiment, these pieces of information are stored in the Validate-Job operation in the print job, but may be stored in another area in the print job.

Next, in step S611, the cloud print driver 803 transmits the converted print job to the cloud print service system 120.

Next, in step S612, the cloud print service system 120 temporarily stores the received print job and also stores the print history. The print history to be stored includes the information about the print job such as the number of pages and the print setting information (double side printing, monochrome printing, and the like), the information about the user who instructs printing which is included in the print job, the printing apparatus information, and the print status information. In step S504 in FIG. 5, the cloud print service system 120 stores the information indicating that printing is in progress as the print status information. However, in a case where the print job includes the information 85 indicating the print status information, it is desirable that the status indicated by the information 85 be stored as the print status information. In step S612, the cloud print service system 120 stores the print history by processing equivalent to that in step S504 for items other than the status information.

Next, in step S613, the cloud print service system 120 checks the information 84 included in the received print job. Then, the cloud print service system 120 determines whether the received print job is the print job for performing actual printing (the value is "off") or the print job for the purpose of log collection printing of which is skipped (the value is "on").

In step S613, in a case where it is determined to actually perform printing (in a case where the value of the information 84 is "off"), the cloud print service system 120 transmits the print job to the printing apparatus 112 to perform printing. Specifically, the cloud print service system 120 executes printing via the cloud by executing the processing in steps S505 to S508 in FIG. 5.

Whereas, in step S613, in a case where it is determined to skip printing (in a case where the value of the information 84 is "on"), the cloud print service system 120 terminates the processing without causing the printing apparatus 112 to execute printing via the cloud. In other words, the cloud print service system 120 does not transmit the print job to the printing apparatus 112.

According to the above-described processing, the print history can be stored in the cloud print service system 120 even for the print job printing of which is executed using the printer driver 807 without going through the cloud print service system 120. Accordingly, even in a case where printing is executed in a situation in which the information processing apparatus 130 is temporarily not connected to the Internet at a place of visit and the like, the print history based on the printing is stored in the cloud print service system 120 in a unitary manner. Thus, the administrator can manage the print history in a unitary manner, which can reduce a management burden.

The present exemplary embodiment can also be applied to a case of work at home and the like in which business printing is performed using a printing apparatus which does not handle (does not support) printing from the cloud print service system 120. Specifically, if printing is executed using the printer driver 807, and it is determined in step S607 that cloud printing can be used, a print history of the printing is accumulated in the cloud print service system 120 based on the flow illustrated in FIG. 6. In this way, the administrator can manage and refer to the print history and a print volume in the work at home and pay an employee a cost of printing incurred during the work at home.

In step S606, the log collection application 808 may further delete entire drawing information of each page in the print job to make the page blank or may leave only one page and delete information of other pages. Since the print job to be edited in step S606 is the print job for storing the print history, if information thereof is not necessary, the print job to be transmitted to the cloud print service system can be lightened by deleting the information.

The log collection application 808 according to the above-described example monitors all the printer drivers installed on the information processing apparatus 130 in step S602, but may be configured to be able to specify the printer driver to be monitored. Accordingly, a printer driver which is used for a special purpose such as converting a document format and does not involve a print operation can be excluded from a target for storing a print history.

According to the above-described example of the present exemplary embodiment, a print job for storing a print history (for log collection) is generated and transmitted by the cloud print driver 803, but the present exemplary embodiment is not limited to this example. In other words, the log collection application 808 itself may generate and transmit a print job for storing a print history to the cloud print service system 120.

Figure 9:
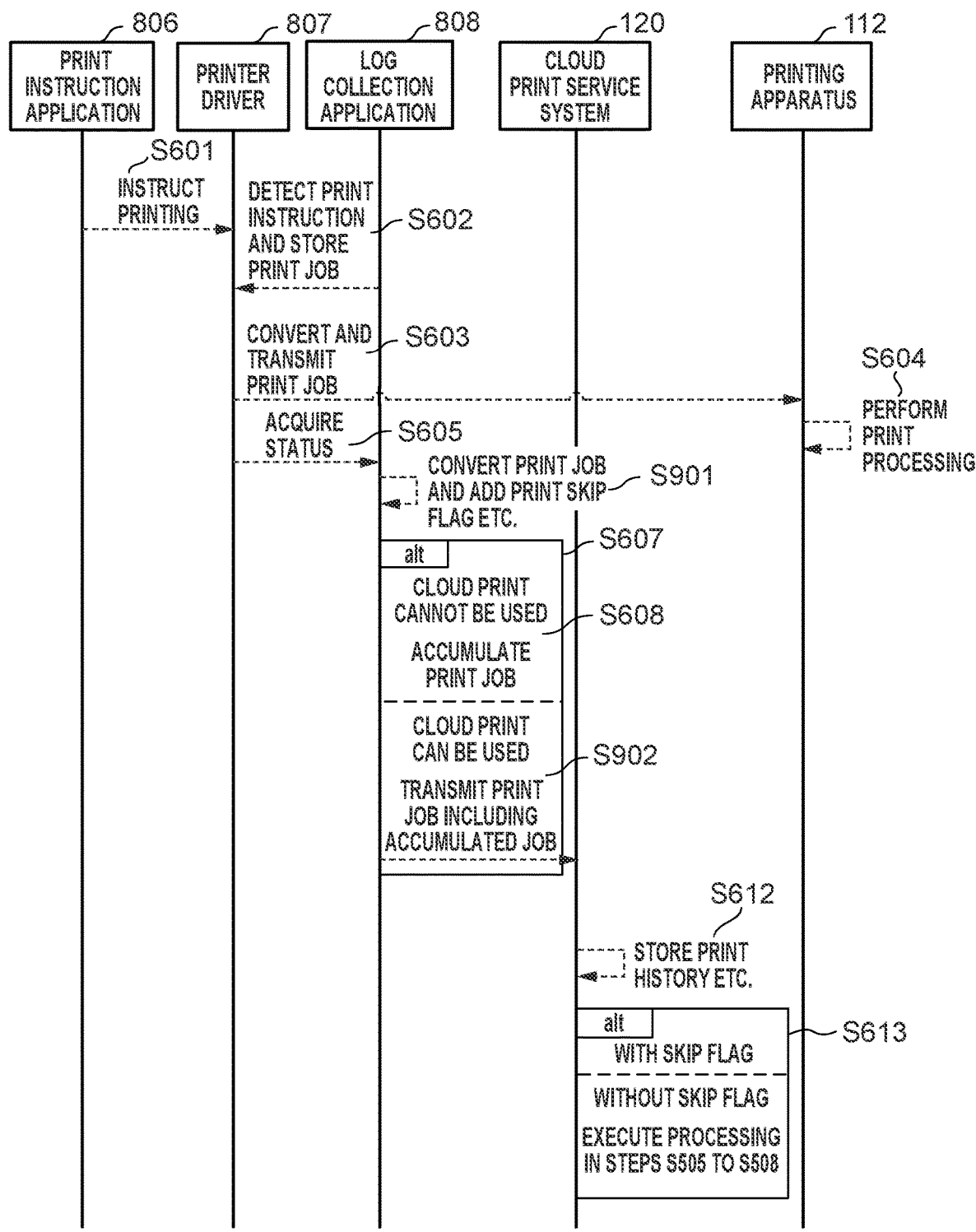
FIG. 9 is a sequence diagram illustrating another configuration of a print flow via the printer driver.

FIG. 9 illustrates a print flow via the printer driver according to the above-described configuration. In step S901, the log collection application 808 converts the print job stored in step S602 into a print job in the format based on the IPP specification. Further, the log collection application 808 adds the flag for skipping printing (the information 84) and the status information of the print job (the information 85) to the print job.

Then, in step S607, in a case where it is determined that cloud printing can be used, in step S902, the log collection application 808 transmits the print job generated in step S901 to the cloud print service system 120. For other processing, the same processing as the processing having the same step number in FIG. 6 is executed. In the case of this configuration example, the present exemplary embodiment can be realized even in a case where the cloud print driver 803 cannot specify the information 703 and the information 704 to be used for storing the print history. In other words, this configuration is desirable because the log collection application 808 can generate a print job including the information 84 and the information 85 which are necessary for storing the print history by itself.

In addition, the processing in steps S901, S607, S608, and S902 by the log collection application 808 may be performed by the printer driver 807. In this case, it is not necessary to install the log collection application 808 on the information processing apparatus 130. Further, the processing for monitoring the print job of the printer driver as in step S602 is also not necessary, and thus a processing load on the information processing apparatus 130 can be reduced. In addition, status monitoring processing in step S605 is not necessary, and the print status information grasped in accordance with the print processing in step S603 by the printer driver 807 can be used, so that the print status information becomes more accurate.

In the example in FIG. 6 according to the present exemplary embodiment, the cloud print service system 120 executes the processing for determining whether to perform actual printing in step S613, but this determining processing may be performed by the printing apparatus.

FIG. 10 illustrates a print flow via the printer driver according to the above-described configuration. In step S505, the cloud print service system 120 transmits a print job to the printing apparatus 111 specified in the print job regardless of presence or absence of a print skip flag in the print job.

If the print job is received, in step S1001, the printing apparatus 111 determines whether a print skip is specified by referring to the information 84. In a case where it is determined that the print skip is specified in step S1001, in step S1002, the printing apparatus 111 transmits the job status to the cloud print service system 120 without executing printing. Whereas, in a case where it is determined that the print skip is not specified in step S1001, in step S506, the printing apparatus 111 executes printing.

In a case where print processing is executed in step S506, a status corresponding to the print processing is transmitted, and in a case where the print processing is not executed, information indicated by the information 85 included in the print job is returned. For other processing, the same processing as the processing having the same step number in FIG. 9 is executed. In this configuration, the present exemplary embodiment can be realized even in a case where the cloud print service system 120 cannot instruct the information 84 and the information 85 to be used for storing the print history. In other words, the log collection application 808 can generate a print job including the information 84 and the information 85 which are necessary for storing the print history by itself.

FIGS. 6, 7, and 8 illustrate processing that differs partially in the respective configurations, and the different processing may be combined with each other.

A second exemplary embodiment will be described. The above-described exemplary embodiment is also executed by executing a following processing. Specifically, a storage medium storing a program code of software realizing a function according to the above-described exemplary embodiment is supplied to a system or an apparatus. Further, a computer (or a central processing unit (CPU) or a micro processing unit (MPU)) of the system or the apparatus reads and executes the program code stored in the storage medium, thereby achieving the above-described purpose. In this case, the program code itself read from the storage medium realizes the function of the above-described exemplary embodiment, and thus the storage medium storing the program code constitutes embodiments of the present disclosure.

As the storage medium for supplying the program code, for example, a flexible disk, a hard disk, an optical disk, a magneto-optical disk, a compact disk read only memory (CD-ROM), a CD recordable (CD-R), a magnetic tape, a nonvolatile memory card, a ROM, and a digital versatile disk (DVD) can be used.

The function of the above-described exemplary embodiment is not only realized by executing the program code read by the computer. Embodiments of the present disclosure include a case in which an OS operating in the computer and the like executes a part of or all the actual processing based on an instruction from the program code, and the function of the above-described exemplary embodiment is realized by the processing.

The program code read from the storage medium may be written into a function expansion board inserted into the computer and a memory provided in a function expansion unit connected to the computer. Further, the function expansion board and a CPU provided in the function expansion unit may execute a part of or all actual processing based on an instruction from the program code. The function according to the above-described exemplary embodiment is realized by the processing.

A print history can be managed by an aspect of embodiments of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-053209, filed Mar. 26, 2021, which is hereby incorporated by reference herein in its entirety.

What is claimed is:

1. A non-transitory computer-readable storage medium storing a program for causing an information processing apparatus which communicates with a server system to execute a control method, wherein the control method comprises:
    acquiring print setting information of a first print instruction in a first format transmitted from the information processing apparatus to a printing apparatus without going through the server system;
    editing the acquired print setting information; and
    transmitting a second print instruction including the edited print setting information to the server system,
    wherein the second print instruction which is converted into a second format different from the first format is transmitted to the server system.

2. The non-transitory computer-readable storage medium according to claim 1, wherein the second print instruction which is converted into a format based on an Internet Printing Protocol (IPP) specification as the second format is transmitted to the server system.

3. The non-transitory computer-readable storage medium according to claim 1, wherein the first print instruction is in a format different from a format based on an Internet Printing Protocol (IPP) specification and is generated by print data generation software which generates a print instruction in the first format.

4. The non-transitory computer-readable storage medium according to claim 1, wherein a print history is stored based on the second print instruction by the server system.

5. The non-transitory computer-readable storage medium according to claim 1,
wherein editing for adding first information to the acquired print setting information is executed, and
wherein, in a case where the second print instruction to which the first information is added is transmitted to the server system, the printing apparatus does not execute printing.

6. The non-transitory computer-readable storage medium according to claim 5, wherein, in a case where the second print instruction to which the first information is added is transmitted to the server system, a print instruction based on the second print instruction is not transmitted from the server system to the printing apparatus, and accordingly the printing apparatus does not execute printing.

7. The non-transitory computer-readable storage medium according to claim 5, wherein, in a case where the second print instruction to which the first information is added is transmitted to the server system, even if a print job based on the second print instruction is transmitted from the server system to the printing apparatus, the printing apparatus does not execute printing.

8. The non-transitory computer-readable storage medium according to claim 1, wherein, in a case of a state where the second print instruction cannot be transmitted to the server system, the second print instruction is stored in the information processing apparatus.

9. A print system including an information processing apparatus, a server system, and a printing apparatus,
wherein the information processing apparatus comprises:
an acquisition unit configured to acquire print setting information of a first print instruction in a first format transmitted from the information processing apparatus to the printing apparatus without going through the server system;
an editing unit configured to edit the acquired print setting information; and
a transmission unit configured to transmit a second print instruction including the edited print setting information to the server system, wherein the server system comprises:
a reception unit configured to receive the second print instruction transmitted from the information processing apparatus; and
a storage unit configured to store a print history based on the received second print instruction,
wherein the printing apparatus does not execute printing based on the second print instruction received by the server system, and
wherein the second print instruction which is converted into a second format different from the first format is transmitted to the server system.

10. The print system according to claim 9, wherein the second print instruction which is converted into a format based on an Internet Printing Protocol (IPP) specification as the second format is transmitted to the server system.

11. The print system according to claim 9, wherein the first print instruction is in a format different from a format based on an Internet Printing Protocol (IPP) specification and is generated by print data generation software which generates a print instruction in the first format.

12. The print system according to claim 9, wherein a print history is stored based on the second print instruction by the server system.

13. The print system according to claim 9,
wherein the editing unit executes editing for adding first information to the acquired print setting information, and
wherein, in a case where the second print instruction to which the first information is added is transmitted to the server system, the printing apparatus does not execute printing.

14. The print system according to claim 13, wherein, in a case where the second print instruction to which the first information is added is transmitted to the server system, a print instruction based on the second print instruction is not transmitted from the server system to the printing apparatus, and accordingly the printing apparatus does not execute printing.

15. The print system according to claim 13, wherein, in a case where the second print instruction to which the first information is added is transmitted to the server system, even if a print job based on the second print instruction is transmitted from the server system to the printing apparatus, the printing apparatus does not execute printing.

16. The print system according to claim 9, wherein, in a case of a state in which the second print instruction cannot be transmitted to the server system, the second print instruction is stored in the information processing apparatus.

17. A control method for an information processing apparatus which communicates with a server system, the control method comprising:
acquiring print setting information of a first print instruction in a first format transmitted from the information processing apparatus to a printing apparatus without going through the server system;
editing the acquired print setting information; and
transmitting a second print instruction including the edited print setting information to the server system,
wherein the second print instruction which is converted into a second format different from the first format is transmitted to the server system.

18. A non-transitory computer-readable storage medium storing a program for causing an information processing apparatus which communicates with a server system to execute a control method, wherein the control method comprises:
acquiring print setting information of a first print instruction in a first format transmitted from the information processing apparatus to a printing apparatus without going through the server system;
editing the acquired print setting information; and
transmitting a second print instruction including the edited print setting information to the server system,
wherein editing for adding first information to the acquired print setting information is executed,
wherein, in a case where the second print instruction to which the first information is added is transmitted to the server system, the printing apparatus does not execute printing, and
wherein, in a case where the second print instruction to which the first information is added is transmitted to the server system, a print instruction based on the second print instruction is not transmitted from the server system to the printing apparatus, and accordingly the printing apparatus does not execute printing.

19. A non-transitory computer-readable storage medium storing a program for causing an information processing apparatus which communicates with a server system to execute a control method, wherein the control method comprises:

acquiring print setting information of a first print instruction in a first format transmitted from the information processing apparatus to a printing apparatus without going through the server system;

editing the acquired print setting information; and transmitting a second print instruction including the edited print setting information to the server system, wherein editing for adding first information to the acquired print setting information is executed, wherein, in a case where the second print instruction to which the first information is added is transmitted to the server system, the printing apparatus does not execute printing, and wherein, in a case where the second print instruction to which the first information is added is transmitted to the server system, even if a print job based on the second print instruction is transmitted from the server system to the printing apparatus, the printing apparatus does not execute printing.

20. A non-transitory computer-readable storage medium storing a program for causing an information processing apparatus which communicates with a server system to execute a control method, wherein the control method comprises:

acquiring print setting information of a first print instruction in a first format transmitted from the information processing apparatus to a printing apparatus without going through the server system;

editing the acquired print setting information; and transmitting a second print instruction including the edited print setting information to the server system, wherein, in a case of a state where the second print instruction cannot be transmitted to the server system, the second print instruction is stored in the information processing apparatus.

* * * * *